April 13, 1954  G. J. LAEMMLE, JR  2,675,401
RECOVERY OF ORGANIC OXYGENATED COMPOUNDS
Filed June 23, 1950
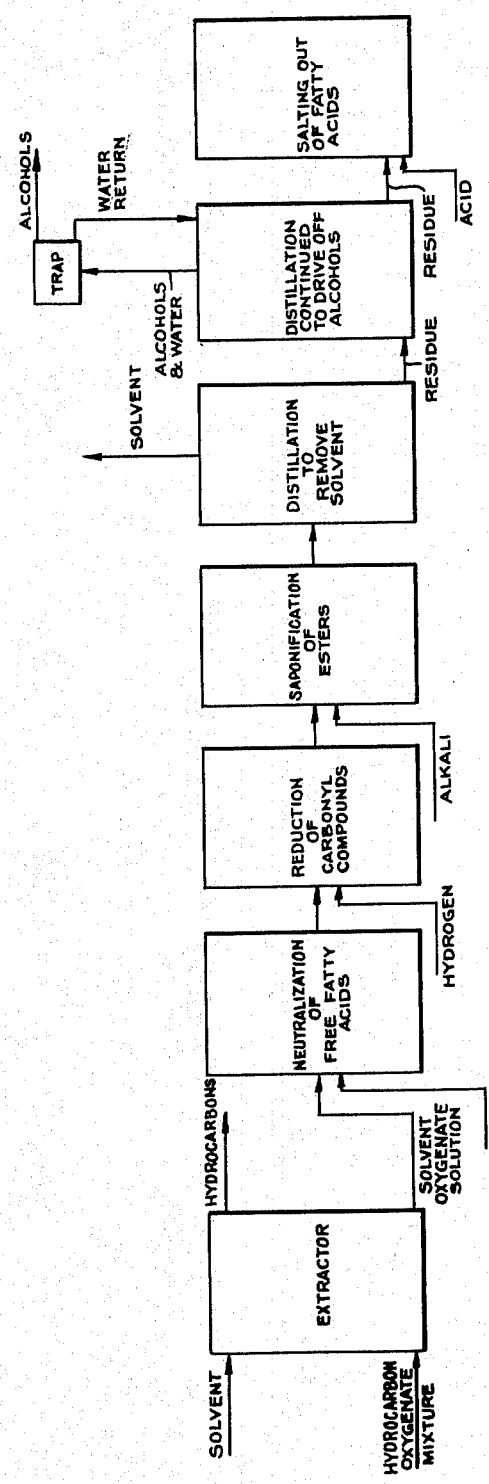
INVENTOR
George Joseph Laemmle Jr.
BY
Benjamin Sweedler
ATTORNEY Patented Apr. 13, 1954

2,675,401

UNITED STATES PATENT OFFICE 2,675,401

RECOVERY OF ORGANIC OXYGENATED COMPOUNDS

George Joseph Laemmle, Jr., Austin, Tex., assignor to Jefferson Chemical Company, Inc., New York, N. Y., a corporation of Delaware Application June 23, 1950, Serial No. 169,825

9 Claims. (Cl. 260—450)

This invention relates to the recovery of organic oxygenated compounds, and more particularly to the recovery of such compounds from the mixture of hydrocarbons and oxygenates produced in the hydrogenation of carbon monoxide.

The condensation of the vapor reaction products produced in the hydrogenation of carbon monoxide by well known catalytic techniques, including the fluidized catalytic technique, followed by the stratification of the condensate results in the production of a water layer and a hydrocarbon or oil layer both of which contain oxygenated organic compounds. The mixture of byproduct oxygenates invariably is exceedingly complex and is distributed between the hydrocarbon and synthesis water concurrently produced in accordance with the solubility characteristics of the oxygenates in hydrocarbons and water, respectively.

The hydrocarbon layer may be fractioned to produce a gasoline fraction containing significant quantities of oxygenated compounds having from about three to about ten carbon atoms with substances in the $C_4$ to $C_8$ range predominating. Among the oxygenates present may be mentioned the predominantly saturated aliphatic acids and alcohols including branched chain isomers, such, for example, as propionic acid, butyric acid, isobutyric acid, n-valeric acid, caprylic acid, butyl alcohols, pentyl alcohols, isomeric hexanols, etc.; aldehydes, such as propionaldehyde, n-butyraldehyde, isobutyraldehyde, valeraldehyde; ketones, such as methyl-propyl ketone, methyl-butyl ketone, methyl-ethyl ketone, etc.; esters, such as propyl butyrate, butylisovalerate, ethyl oenanthate, hexyl propionate, etc. and trace amounts of phenols and aromatic hydrocarbons. This invention is particularly concerned with the recovery of oxygenates from such gasoline fraction.

Extraction of the oxygenates from the mixture thereof with hydrocarbons employing suitable solvents which do not appreciably dissolve in or retain hydrocarbons has been suggested. For example, the use of methanol-water mixtures and the separation of the methanol from the oxygenate extract by fractional distillation has been proposed.

However, the methanol thus separated is not obtained in a pure state or in such state that it can be efficiently re-used for extracting oxygenates from hydrocarbon-oxygenate mixtures. This has been ascribed to the co-distillation of constant-boiling mixtures of water and higher oxygenates with the methanol. Other solvents suggested for extraction of oxygenates have been found objectionable or unsatisfactory for a number of reasons among which may be mentioned: they do not result in satisfactory recovery of oxygenates, they are not sufficiently selective between the oxygenates and the hydrocarbons, or they can not be readily or economically separated from the oxygenates for re-use.

I have made the surprising discovery that the methanol or other analogous solvent can be recovered in a form such that it can be re-used to extract the oxygenates from the mixture thereof with hydrocarbons by treating the solvent extract of the oxygenates to convert the carbonyl compounds, i. e., the ketones and aldehydes, to alcohols and the esters to acids and alcohols, and thereafter subjecting the resulting mixture to distillation to separate the solvent from the oxygenates. On the basis of my research work in this field I believe that it is chiefly the esters and carbonyl compounds present in the oxygenates which form azeotropes with the methanol or other analogous solvent and that the alcohols have little or no tendency to form such azeotropes. Consequently, by converting the carbonyl compounds to alcohols and the esters to alcohols and salts of acids, a mixture is produced consisting primarily of solvent, alcohols, and salts of acids, which when distilled results in the recovery of the solvent in a directly re-usable form. The mixture of acid salts and alcohols can readily be separated, as hereinafter more fully described. It will be understood that this invention is not to be limited to the above noted theory or explanation of its operation.

As the solvent for separating the oxygenates from the hydrocarbons, aliphatic alcohol-water mixtures containing from 5% to 30% by weight of water may be used. Methanol, ethanol, isopropanol or n-propanol may be employed as the aliphatic alcohol; methanol is preferred. In the interests of economy the minimum quantity of solvent necessary to obtain substantially complete extraction of the oxygenates should be used. In general from ½ to 2 volumes of solvent per volume of hydrocarbon and oxygenate mixture may be employed.

The extraction may be carried out in any known manner such as intimately mixing the solvent and oxygenate-hydrocarbon mixture, then stratifying and withdrawing the oxygenate solution from the hydrocarbon or continuously flowing in countercurrent directions through one or a series of packed towers the oxygenate and hydrocarbon mixture and the solvent. The extraction may be carried out under any conditions of temperature and pressure at which the solvent and oxygenate-hydrocarbon mixture remain in the liquid phase and are at least partially immiscible; desirably the extraction is effected at pressures not substantially in excess of atmospheric and under atmospheric temperature conditions, i. e. about 25° C.

The solvent extract of oxygenates is subjected to a reduction treatment to convert the carbonyl compounds to primary and secondary alcohols. This reduction may be carried out by any of the various reduction methods known to the art. Preferably, it is carried out by subjecting the mixture to catalytic hydrogenation in the presence of a nickel, platinum, palladium, copper chromite, or other suitable catalyst. For example, the extract may be treated with alkali to neutralize the free fatty acids present and the resulting neutral solution hydrogenated in the presence of from ½% to 10% by weight of Raney nickel at 100° to 200° C. under from 50 to 1000 pounds pressure for from one to five hours. Neutralization of the free fatty acids before subjecting the mixture to reduction minimizes corrosion of equipment and attack on the catalyst employed in effecting the reduction.

The resultant mixture of solvent, alcohols, esters and aliphatic acid salts is subjected to saponification with alkali, e. g., sodium or potassium, hydroxide, carbonate or sesquicarbonate to hydrolize the esters to the constituent acids and alcohols. The saponification is carried out by adding to the mixture at least one and preferably two or more mols of alkali for each mol of ester present and refluxing the resultant mixture until substantially all of the esters have been converted to acid salts and alcohols.

In order to obtain maximum oxygenate yield, it is important that the carbonyl compounds be reduced to the corresponding alcohols before the esters are saponified. In this way loss of oxygenates due to condensation reactions of the carbonyl compounds catalyzed by the alkali employed in the saponification reaction is eliminated.

The mixture containing the solvent, aliphatic alcohols and alkali metal salts of the aliphatic acids is distilled to separate the solvent from the mixture. Distillation of the residue is continued for a short time after removal of the solvent, and as soon as droplets of oil appear in the distillate the flow of condensate is diverted to a trap designed to permit removal of oil distillate and return of water to the still. The oil distillate thus collected contains the water insoluble alcohols. These alcohols may be dried, for example, by treatment with anhydrous potassium carbonate, and, if desired, the alcohol mixture may be fractioned to separate them into individual alcohols or narrow-boiling alcohol fractions. Alternatively aliphatic alcohols containing 4–10 carbon atoms may be dried conveniently by distilling out the alcohol-water azeotropes. The aqueous phase thus obtained may be treated for recovery of the dissolved alcohols, as, for example, by distilling out the alcohol-water azeotropes, or it can be used for re-diluting the recovered alcohol solvent and thus recycled to the process.

The residue from the distillation effecting the removal of the alcohols is acidified with an inorganic acid, such as sulfuric acid. The separated acids may be removed by gravity separation, and the aqueous phase with its dissolved aliphatic acids either discarded or extracted with a solvent such as ether to recover the aliphatic acids. Alternatively, the aliphatic acids may be recovered as an aqueous mixture by distilling the aqueous phase. If desired, the aliphatic acids may be salted out, for example, by saturating the aliphatic acid solution with sodium chloride. The aliphatic acids separate as an amber colored upper layer which is drawn off. Residual aliphatic acids remaining in solution in the brine may, if desired, be separated by a suitable solvent, such as ethyl ether. The aliphatic acids thus produced may be fractioned to obtain relatively pure aliphatic acids.

The accompanying drawing is a self-explanatory flow sheet indicating the important steps of the process embodying this invention as applied to the treatment of a hydrocarbon-and-oxygenate mixture containing free fatty acids. It will be understood this invention is not limited to the particular order of the steps shown or to the treatment of a mixture containing free fatty acids. The invention includes the resolution of a mixture of oxygenates containing carbonyl compounds and esters and substantially devoid of free fatty acids. The treatment of such mixture would involve only those steps, noted on the flow sheet, following the step of neutralizing the free fatty acids.

The following example is illustrative of the invention. It will be understood this invention is not limited to this example. All parts are by weight unless otherwise stated.

The hydrocarbon-and-oxygenate mixture employed in this example was produced by subjecting to fractional distillation the hydrocarbon layer obtained, as hereinabove described, by the catalytic hydrogenation of carbon monoxide and collecting a fraction having a boiling range of from 30° to 205° C. The oxygenate content of 1000 grams of this fraction was as follows: aliphatic acids 0.180 gram mols, esters 0.510 gram mols, alcohols 0.899 gram mols, carbonyls 0.860 gram mols, total gram mols 2.449 computing the esters as such or 2.959 gram mols computing the esters as hydrolyzed to their alcohol and acid components.

1000 grams of this fraction were countercurrently extracted with 964 grams of aqueous methanol (80 weight % methanol) to give 1130 grams of extract containing oxygenates as follows: aliphatic acids 0.180 gram mols, esters 0.234 gram mols, alcohols 0.899 gram mols, carbonyls 0.760 gram mols, which equals 2.073 gram mols computing the esters as such or 2.307 gram mols computing the esters as hydrolyzed to their alcohol and acid components.

To the extract was added about 7.2 grams of caustic soda to neutralize the free fatty acids present. The resulting neutral solution was then hydrogenated in the presence of 2% of Raney nickel at 150° C. and 750 pounds/sq. in. pressure for 2 hours. Reduction of carbonyl compounds, as indicated by pressure drop, was substantially complete at the end of this time.

The hydrogenated product was separated from the catalyst by filtration. To the hydrogenated product thus produced was added 90 grams of 20% caustic soda (corresponding to about 2 mols of alkali for each mol of ester present). The alkaline mixture was refluxed for 1.5 hours at 72 C. at the end of which time hydrolysis of the esters to their constituent alcohol and acid components was complete.

The alkaline mixture was then distilled in a fractionating column using a reflux ratio of 10 to 1 to recover solvent methanol. A small amount of hydrocarbon material distilled with the methanol in the foreruns was separated from the methanol. This hydrocarbon represented 1½% by weight of the total distillate collected up to an end point of 67° C. 669 grams of methanol solvent (of which 95 per cent distilled between 62 and 64½° C.) was recovered up to an end point of 67° C. This had a refractive index ($n_D^{20}$) of 1.3315 and a hydroxyl number of 1655. Theoretical values for methanol are 1.3288 and 1751. The recovery of methanol was thus about 82%.

After recovery of the methanol, distillation was continued a short time as the still-head temperature climbed to about 88° C., at which point droplets of oil began to appear in the distillate, and the condensate was then diverted to a trap arranged to permit return of the aqueous co-distillate to the still pot while collecting the water-insoluble phase of the distillate. Distillation was thus continued for about four hours at the end of which time no more oil was being collected overhead. The wet crude alcohol fraction so obtained weighed about 200 grams and was dried with anhydrous potassium carbonate. After such drying it weighed 155 grams and was found to contain 1.794 gram mols of alcohols, which were chiefly in the $C_4$–$C_7$ range.

The distillate collected between 67 and 88° C. amounted to about 25 grams and consisted largely of water and the lower ($C_1$–$C_3$) alcohols.

The residue remaining after removal of alcohols, consisting of about 200 grams, was made acid to methyl red with about 125 grams of 25 per cent sulfuric acid, and subjected to distillation. When the fatty acids had been virtually all distilled, the distillate weighed 204.5 grams and contained 0.372 gram mols of acids. It was saturated with about 75 grams of sodium chloride and an oily layer of fatty acids was separated and dried with calcium chloride. This portion of acids weighed 20.4 grams, and contained 0.192 gram mols of acids. By ether extraction of the salt-saturated aqueous layer, followed by drying the extract with calcium chloride and evaporation of the ether, there was obtained an additional 16.7 grams of acids (0.179 gram mols). The acids so recovered were in the form of a mixture of normal and isomeric fatty acids ranging in carbon content from about $C_3$ to $C_8$.

The combined yield of separated aliphatic acids and water-immiscible alcohols was 93.9 mol per cent of the quantity estimated as potentially available in the methanol extract and 73.3 mol per cent of the quantity available in the original synthesis oil fraction.

The recovered methanol contained no esters or carbonyl compounds. To determine its suitability for re-use, it was diluted with water to a concentration of 85% by weight and the resulting prepared solvent was compared with freshly prepared 85% methanol for the extraction of hydrocarbon oxygenate mixtures. The recovered methanol was found to have substantially the same solvent capacity and selectivity for oxygenates as a freshly prepared methanol solvent.

It will be noted this invention provides a method of recovering oxygenates in admixture with hydrocarbons by extraction with a suitable solvent, which solvent is recovered from the extract in a form such that it can be re-used to extract oxygenates from the hydrocarbon-and-oxygenate mixture. Furthermore, this invention provides a process for resolving a mixture of organic oxygenates comprising alcohols, aldehydes, ketones and esters into mixtures of alcohols and aliphatic acids which process can readily be carried out with relatively high recoveries of the oxygenates.

Since different embodiments of the invention could be made without departing from the scope of the invention, it is intended that all matter contained in the above description shall be interpreted as illustrative and not in a limiting sense. Thus, it will be understood this invention is not limited to the resolution of oxygenates obtained as a by-product in the catalytic hydrogenation of carbon monoxide but includes the resolution of oxygenate mixtures comprising carbonyl compounds, esters and alcohols irrespective of how such mixtures are produced.

What is claimed is:

1. In a process for separating organic oxygenated compounds produced in the catalytic hydrogenation of carbon monoxide, which oxygenated compounds comprise alcohols, ketones, aldehydes, esters and free acids, the steps which comprise neutralizing the free acids present in the mixture by adding alkali thereto in amount to form a neutral mixture, catalytically hydrogenating this neutral mixture in the presence of a metallic catalyst to convert the ketones and aldehydes to the corresponding alcohols, thereafter saponifying the resultant mixture to convert the esters to the corresponding alcohols and acid salts and distilling the resulting mixture to separate the alcohols therefrom.

2. In a process for separating organic oxygenated compounds produced in the catalytic hydrogenation of carbon monoxide, which oxygenated compounds comprise alcohols, ketones, aldehydes, esters and free acids, the steps which comprise neutralizing the free acids present in the mixture by adding alkali thereto in amount to form a neutral mixture, hydrogenating the neutralized mixture in the presence of a nickel catalyst under superatmospheric pressure to convert the ketones and aldehydes to the corresponding alcohols, thereafter saponifying the resultant mixture with at least one mol of alkali per mol of ester to convert the esters to the corresponding alcohols and acid salts and distilling the resulting mixture to separate the alcohols therefrom.

3. In a process of separating organic oxygenated compounds from the hydrocarbons simultaneously produced in the catalytic hydrogenation of carbon monoxide, the steps which comprise extracting the hydrocarbon-and-oxygenate mixture with a hydrocarbon-immiscible alcoholic solvent to remove the oxygenated compounds therefrom, treating the resultant extract to convert carbonyl compounds to the corresponding alcohols, treating the extract to convert esters to the corresponding alcohols and acid salts, and thereafter distilling the resulting mixture to drive off overhead the solvent substantially free of said alcohols and said acid salts.

4. In a process of separating organic oxygenated compounds from the hydrocarbons simultaneously produced in the catalytic hydrogenation of carbon monoxide, the steps which comprise extracting the hydrocarbon-and-oxygenate mixture with a methanol-water mixture containing from 5% to 30% water to remove the oxygenated compounds from the hydrocarbon-and-oxygenate mixture, catalytically hydrogenating the resulting methanol solution of oxygenates to convert carbonyl compounds to alcohols, thereafter treating the resulting hydrogenated mixture with alkali to saponify the esters and convert them to corresponding alcohols and aliphatic acid salts, distilling the resultant mixture to drive off overhead the methanol solvent, and continuing the distillation to separate the alcohols from the residue.

5. In a process of separating organic oxygenates from a fraction produced in the catalytic hydrogenation of carbon monoxide, the steps which comprise extracting the fraction with an aqueous aliphatic alcohol from the group consisting of methanol, ethanol, isopropanol and n-propanol, said aqueous alcohol containing from 5% to 30% water to produce an alcohol extract containing oxygenates comprising organic acids, esters, alcohols and carbonyl compounds, adding alkali to the alcohol extract in amounts just sufficient to neutralize the free organic acids present, hydrogenating the neutral extract in the presence of a nickel catalyst to convert the carbonyl compounds to the corresponding alcohols, adding at least 1 mol of caustic soda per mol of ester to the hydrogenated extract and refluxing the mixture until the esters are saponified, distilling the resulting alkaline solution to drive off overhead the alcohol solvent from the mixture, continuing the distillation while returning water to the still and collecting the oil distillate which comes off overhead, acidifying the residue with an inorganic acid and thereafter removing the separated organic acids.

6. In a process of separating organic oxygenates from a fraction produced in the catalytic hydrogenation of carbon monoxide, the steps which comprise extracting the fraction with aqueous methanol containing from 5% to 30% water to produce a methanol extract containing oxygenates comprising organic acids, esters, alcohols and carbonyl compounds, adding alkali to the methanol extract in amounts just sufficient to neutralize the free organic acids present, hydrogenating the neutral extract in the presence of a nickel catalyst to convert the carbonyl compounds to the corresponding alcohols, adding approximately 2 mols of caustic soda per mol of ester to the hydrogenated extract and refluxing the mixture until the esters are saponified, distilling the resulting alkaline solution to drive off overhead the methanol solvent from the mixture, continuing the distillation while returning water to the still and collecting the oil distillate which comes off overhead, acidifying the residue with an inorganic acid and salting out the organic acids from the acidified residue.

7. In a process for resolving a mixture containing hydrocarbons, alcohols, ketones, aldehydes and esters produced in the catalytic hydrogenation of carbon monoxide, the steps which comprise extracting the mixture with a hydrocarbon-immiscible alcoholic solvent for the alcohols, ketones, aldehydes and esters and separating the resultant solution from the hydrocarbons, converting the ketones and aldehydes in said solution to the corresponding alcohols, converting the esters in said solution to alcohols and acids, thereafter distilling the resultant solution to drive off said solvent substantially free of said alcohols, ketones, aldehydes and esters and re-using the solvent thus recovered to extract alcohols, ketones, aldehydes and esters from a mixture thereof with hydrocarbons.

8. In a process for resolving a mixture of hydrocarbons and organic oxygenates including alcohols, ketones, aldehydes and esters having from 3 to 10 carbon atoms, the steps which comprise extracting said mixture with a methanol-water solvent containing from 5% to 30% water to separate the alcohols, ketones, aldehydes and esters from the hydrocarbons, hydrogenating the resulting methanol solution to convert the aldehydes and ketones in said solution to the corresponding alcohols, thereafter saponifying the esters in said solution subjected to hydrogenation to convert them to the corresponding alcohols and acid salts, distilling the resultant mixture to drive off overhead the methanol solvent substantially free of said alcohols, aldehydes, ketones and esters, re-using the methanol solvent thus driven off to extract alcohols, ketones, aldehydes and esters from a mixture thereof with hydrocarbons, and continuing the distillation to separate the said alcohols from the residue.

9. In a process for resolving a mixture of hydrocarbons and organic oxygenates including alcohols, ketones, aldehydes and esters produced in the catalytic hydrogenation of carbon monoxide, the steps which comprise, extracting said mixture with an aqueous solvent from the group consisting of methanol, ethanol, isopropanol and n-propanol, said aqueous solvent containing from 5% to 30% water to separate the organic oxygenates from the hydrocarbons, hydrogenating the resultant aqueous solution to convert aldehydes and ketones in said solution into the corresponding alcohols, thereafter saponifying esters in said solution subjected to hydrogenation to convert them to the corresponding alcohols and acid salts, distilling the resultant mixture to drive off overhead the aqueous solvent substantially free or said organic oxygenates, reusing the aqueous solvent thus driven off to extract organic oxygenates from a mixture thereof with hydrocarbons and continuing the distillation to separate the alcohols from the residue.

References Cited in the file of this patent

UNITED STATES PATENTS

| Number | Name | Date |
|---|---|---|
| 1,716,273 | James | June 4, 1929 |
| 1,870,816 | Lewis | Aug. 9, 1932 |
| 2,171,324 | Zetzsche et al. | Aug. 29, 1939 |
| 2,494,371 | Wadley | Jan. 10, 1950 |
| 2,505,752 | Burton | May 2, 1950 |
| 2,516,940 | Arnold et al. | Aug. 1, 1950 |
| 2,543,038 | McGrath | Feb. 27, 1951 |
| 2,568,717 | Burton et al. | Sept. 25, 1951 |